US008751425B2

(12) United States Patent
Bagley et al.

(10) Patent No.: US 8,751,425 B2
(45) Date of Patent: Jun. 10, 2014

(54) CONSTRAINT SATISFACTION PROBLEM SOLVER WITH INTERACTIVE CONFLICT RESOLUTION

(75) Inventors: Claire M. Bagley, Carlisle, MA (US); Joyce Ng, Sunnyvale, CA (US); Gao Chen, Malden, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1334 days.

(21) Appl. No.: 12/483,647

(22) Filed: Jun. 12, 2009

(65) Prior Publication Data
US 2010/0318483 A1 Dec. 16, 2010

(51) Int. Cl.
*G06F 17/11* (2006.01)
*G06Q 10/04* (2012.01)
*G06G 7/00* (2006.01)

(52) U.S. Cl.
CPC ...................... *G06G 7/00* (2013.01); *G06F 17/11* (2013.01); *G06Q 10/04* (2013.01); *G06Q 10/047* (2013.01)
USPC ............................. 706/45; 706/19

(58) Field of Classification Search
USPC .......................................................... 706/45
See application file for complete search history.

(56) References Cited

U.S. PATENT DOCUMENTS

| 7,069,537 B2 | 6/2006 | Lazarov |
| 7,333,968 B2 | 2/2008 | Geller et al. |
| 2002/0107749 A1 | 8/2002 | Leslie et al. |
| 2002/0143653 A1 | 10/2002 | DiLena et al. |
| 2002/0166089 A1 | 11/2002 | Noy |
| 2004/0019852 A1 | 1/2004 | Purvis |
| 2005/0198621 A1 | 9/2005 | Tillmann et al. |
| 2005/0278271 A1 | 12/2005 | Anthony et al. |
| 2007/0094184 A1 | 4/2007 | Emek et al. |

OTHER PUBLICATIONS

Pu et al., User-Involved Preference Elicitation. [online], 2003 [retrieved on Nov. 5, 2012]. Retrieved from the Internet<URL: http://reference.kfupm.edu.sa/content/u/s/user_involved_preference_elicitation_50935.pdf>.*
DateForUser-Involved Preference Elicitation.*
Fohn et al., Configuring computer systems through constraint-based modeling and interactive constraint satisfaction [online], [retrieved on May 15, 2013]. Retrieved from the Internet<URL:http://ac.els-cdn.com/016636159400041N/1-s2.0-016636159400041N-main.pdf?_tid=2a45ce24-bd97-11e2-8a00-00000aacb35e&acdnat=1368646952_adc37c69725fefe0f3b14aac4d36e08e.*
Amilhastre et al., Handling interactivity in a constraint-based approach of configuration. Configuration, Papers from the Workshop at ECAI [online], Aug. 21-22, 2000 [retrieved on Aug. 12, 2013]. Retrieved from the Internet<URL:http://www.soberit.hut.fi/pdmg/ECAI2000WS/Proceedings.pdf>.*

(Continued)

*Primary Examiner* — Jeffrey A Gaffin
*Assistant Examiner* — Nathan Brown, Jr.
(74) *Attorney, Agent, or Firm* — Miles & Stockbridge P.C.

(57) ABSTRACT

A solver solves constraint satisfaction problems. The solver receives a user decision and propagates the user decision over a constraint satisfaction problem network. The solver then determines if there is a conflict on the network based on the propagation. If there is a conflict, the solver allows a user to resolve the conflict interactively by either canceling the user decision or dropping one or more previously made user decisions.

19 Claims, 4 Drawing Sheets

(56) References Cited

OTHER PUBLICATIONS

Veron et al., Yet Another Approach to CCSP for Configuration Problem, Configuration, Papers from the Workshop at ECAI [online], Aug. 21-22, 2000 [retrieved on Aug. 12, 2013]. Retrieved from the Internet<URL:http://www.soberit.hut.fi/pdmg/ECAI2000WS/Proceedings.pdf>.*

M. Ishii et al., Interactive Constraint Satisfaction for Office Systems, IEEE pp. 116-124 [online], 1994 [retrieved on Mar. 20, 2012]. Retrieved from the Internet:<http://ieeexplore.ieee.org/stamp/stamp.jsp?tp=&arnumber=323684>.*

Felfernig et al., Intelligent support for interactive configuration of mass-customized products [online], 2001 [retrieved on May 5, 2014]. Retrieved from the Internet:<http://citeseerx.ist.psu.edu/viewdoc/summary?doi=10.1.1.23.1128>.*

Date for Intelligent support.*

Oracle; "Oracle Configurator"; Oracle Data Sheet; 2008; Oracle.

Sabin, Daniel et al.; "Configuration as Composite Constraint Satisfaction; Proceedings of the (1st) Artificial Intelligence and Manufacturing Research Planning Workshop"; 1996.

Gelle, Esther et al.; "Solving Methods for Conditional Constraint Satisfaction"; IJCAL; 2003.

Junker, Ulrich;"QuickXplain: Conflict Detection for Arbitrary Constraint Propagation Algorithms"; ILOG; Valbonne, France; 2001.

* cited by examiner

CONSTRAINT SATISFACTION PROBLEM SOLVER WITH INTERACTIVE CONFLICT RESOLUTION

FIELD OF THE INVENTION

One embodiment is directed generally to a computer system, and in particular to a constraint based computer system that solves constraint satisfaction problems.

BACKGROUND INFORMATION

Many of the tasks that are addressed by decision-making systems and artificial intelligence systems can be represented as constraint satisfaction problems ("CSP"s). In this representation, the task is specified in terms of a set of variables, each of which can assume values in a given domain, and a set of constraints that the variables must simultaneously satisfy. The set of variables, domains and constraints is referred to as a CSP. Each constraint may be expressed as a relation, defined over some subset of the variables, denoting valid combinations of their values. A solution to a CSP is an assignment of a value to all the variables from their respective domains that satisfies all of the constraints.

A constraint based system includes a constraint solver that attempts to find one or more solutions to a given CSP, or prove that no solution exists. Constraint based systems are used for many artificial intelligence related applications and a variety of other applications, including: (1) Product configurators; (2) Robotic control; (3) Temporal reasoning; (4) Natural language processing; (5) Spatial reasoning; (6) Test-case generation for software and hardware systems; (7) Machine vision; (8) Medical diagnosis; (9) Resource allocation; and (10) Frequency allocation.

The network of constraints in a CSP can be viewed as a graph, having a node for each variable and an "arc" for each constraint. The members of each arc are the variables that appear in the constraint to which the arc corresponds. An arc is said to be consistent if for any variable of the arc, and any value in the domain of the variable, there is a valid assignment of values to the other variables on the arc that satisfies the constraint represented by the arc.

Some known constraint based systems allow a user to interact with a computer interface in order to customize and configure a solution by selecting among optional choices and making user decisions. For these systems, constraints are enforced between optional choices, allowing the user to select the choices they want, while validating that the resulting set of user decisions is valid. Some of these known systems are not fully "interactive" because they function as batch systems in which all of the user decisions are initially collected and then checked for validity as a batch. Other known systems, when receiving a user decision, propagate the user decision through its constraint network. However, a conflict due to the propagation will likely cause a removal of some of the prior selections and will likely require a restart of the entire configuration process. This causes the user to have to essentially start over, or at a minimum slows down the processing, thus diminishing the interactive experience.

SUMMARY OF THE INVENTION

One embodiment is a solver that solves constraint satisfaction problems. The solver receives a user decision and propagates the user decision over a constraint satisfaction problem network. The solver then determines if there is a conflict on the network based on the propagation. If there is a conflict, the solver allows a user to resolve the conflict interactively by either canceling the user decision or dropping one or more previously made user decisions.

DETAILED DESCRIPTION

One embodiment is a constraint satisfaction problem solver that receives and propagates a user decision. When the propagation leads to a conflict, the solver interactively allows the user to resolve the conflict by canceling the user decision or relaxing/canceling one or more previous user decisions.

Figure 1:
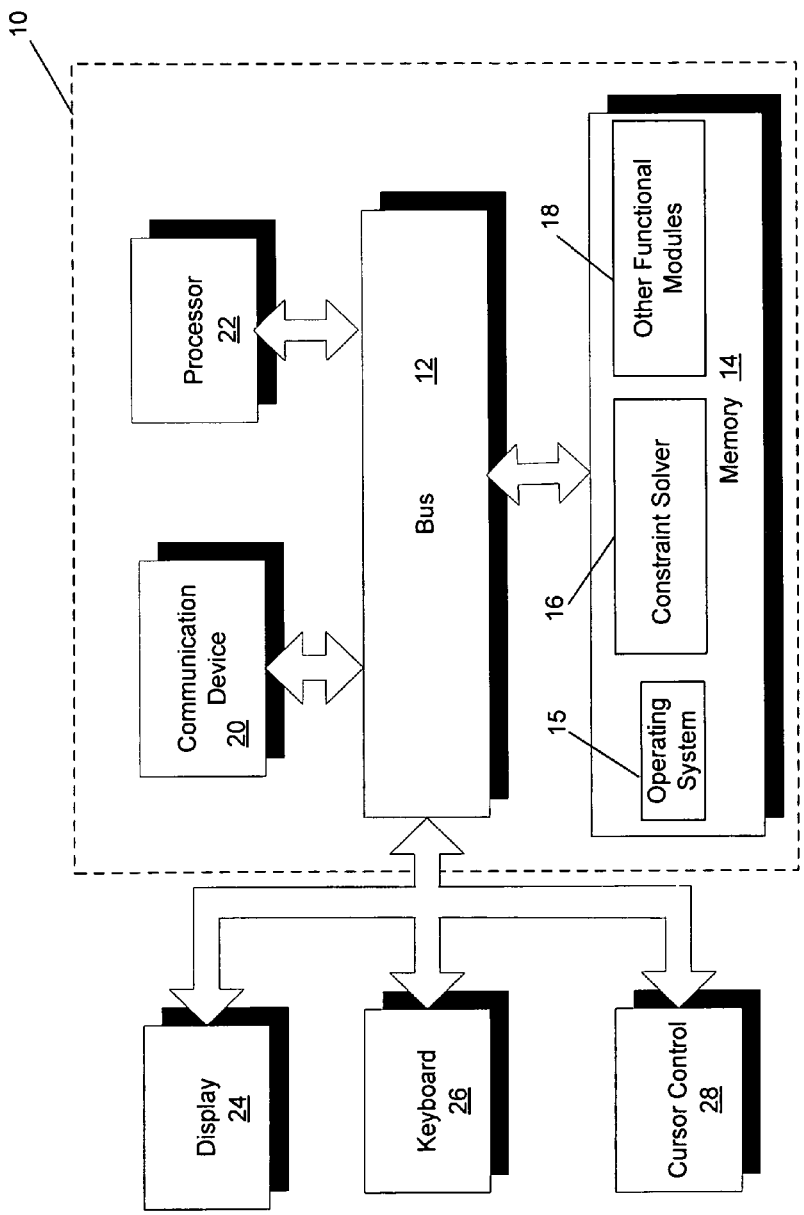
FIG. 1 is a block diagram of a constraint based system that can implement an embodiment of the present invention.

FIG. 1 is a block diagram of a constraint based system 10 that can implement an embodiment of the present invention. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a constraint solver module 16 that performs CSP solving while interactively resolving conflicts as disclosed in more detail below. System 10 can be part of a larger system that includes a constraint solver, such as a product configurator or artificial intelligence system. Therefore, system 10 will typically include one or more additional functional modules 18 to include the additional functionality.

In one embodiment, constraint solver 16 models problems as a network of a set of variables that each have a domain of possible values, and constraints that limit the value that the variables may take. Constraint solver 16 then solves the constraint problem. A solution to the problem is a state in which each variable has had its domain limited to a single value and no constraint has been violated. Constraint solver 16 acts to find one, or more, solutions to a given problem, or to prove that no solution exists.

Table 1 below provides examples of variables and domains, and Table 2 below provides examples of constraints.

TABLE 1

| Variable Name | Type | Domain |
| --- | --- | --- |
| A | Integer (enumerated) | {1, 2, 4, 5, 6} |
| B | Integer (interval) | [1 ... 5] |
| Weight | Float | [1.25 ... 10.50] |
| Choice | Boolean | {false, true} |
| Color | Set | {Black, Red, Silver, Blue} |

TABLE 2

| Constraints |
| --- |
| A = B |
| Weight = Sum (contents.weight) |
| Choice Requires (Not (Color contains Black)) |

An interactive CSP, such as constraint solver 16, allows a user to add runtime constraints (i.e., a user choice/decision) and interact with the system to dynamically guide it to a user-preferred solution. When a user asserts a decision, solver 16 will perform the appropriate consistency checking and propagate the user decision's effect to the rest of the CSP network. If the user decision is consistent with the existing problem state, the user may proceed with their next user decision. Otherwise, if the user decision is inconsistent, then the problem becomes over-constrained and the user will have to resolve the conflict by either: (a) canceling the last attempted user decision that caused the conflict; or (b) dropping/relaxing some previously asserted user decision(s). In one embodiment, solver 16 provides a conflict resolution flow to allow the user to decide which specific user decision or decisions to relax in order to resolve the conflict most economically. In one embodiment, solver 16 is a product configurator for configurating a product and the user decisions are choices that determine the product configuration.

Figure 2:
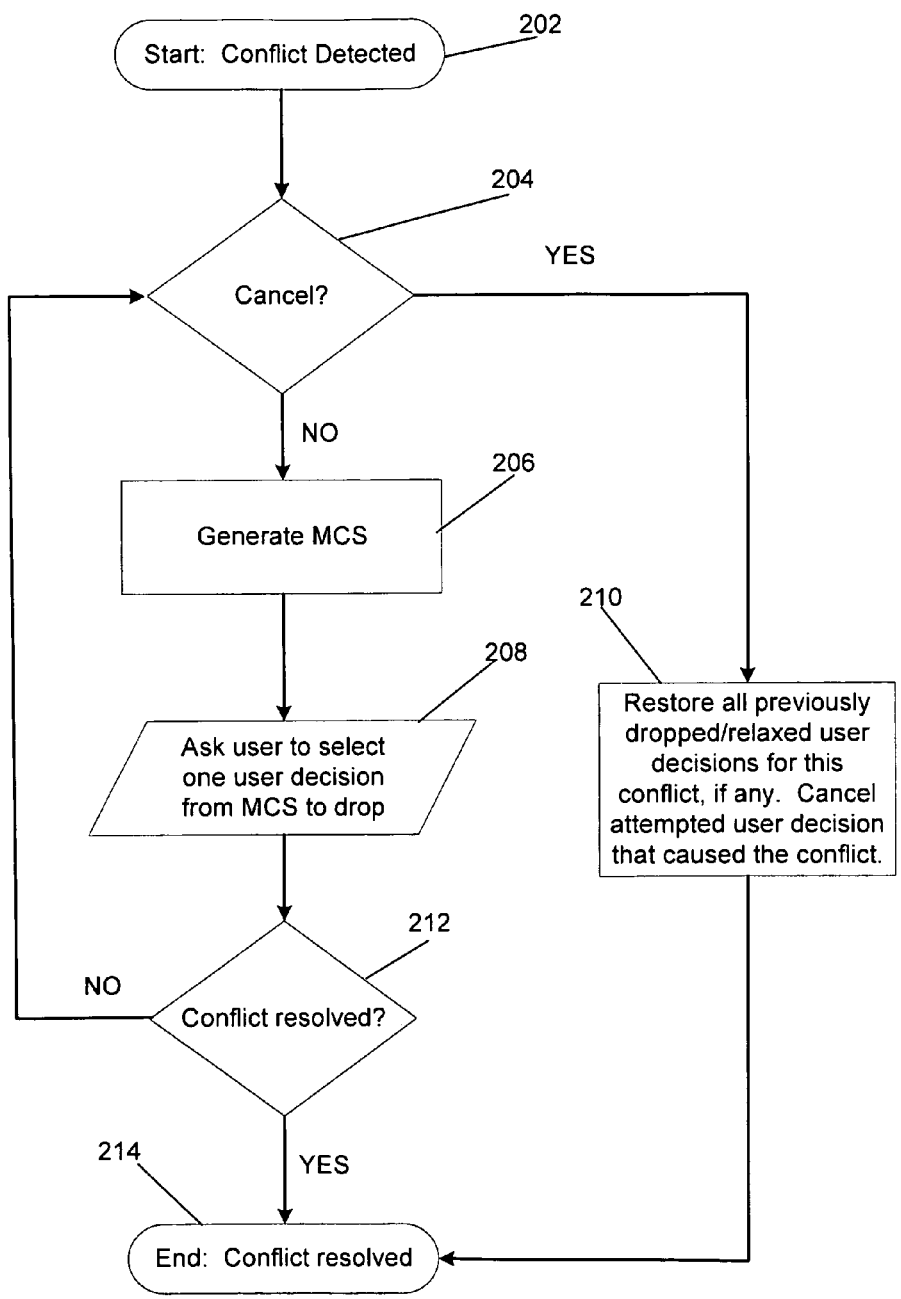
FIG. 2 is a flow diagram of the functionality of a constraint solver module when resolving a conflict in response to the propagation of a user decision in accordance with one embodiment.

FIG. 2 is a flow diagram of the functionality of constraint solver 16 when resolving a conflict in response to the propagation of a user decision in accordance with one embodiment. In one embodiment, the functionality of the flow diagram of FIG. 2 is implemented by software stored in memory or other computer readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 202, a conflict is detected due to a propagation of a user decision.

At 204, the user is presented with an option to cancel the most recent user decision that triggered the conflict. If the user decides to cancel the conflict triggering user decision at 204, at 210 all previously dropped user decisions in resolving the conflict, if any, are restored and the attempted user decision that caused the conflict is cancelled.

If the user does not decide to cancel the conflict triggering user decision at 204, at 206 a Minimum Conflict Set ("MCS") is determined. A MCS is a minimal set of previously made user decisions together with the conflict triggering attempted user decision that are responsible for the conflict, or a subset of the given user decisions that are sufficient to deduce the conflict, but for which no proper subset of them allows one to do so. In one embodiment, the MCS can be determined using the known QuickXplain algorithm which is disclosed, for example, in Ulrich Junker (2001), "QuickXPlain: Conflict Detection for Arbitrary Constraint Propagation Algorithms", *IJCAI'01 Workshop on Modeling and Solving Problems with Constraints*. In other embodiments, the MCS can be determined using other methods.

At 208, the user is provided with a request to select one user decision from the MCS to drop.

At 212, after the user decision has been dropped at 208, it is determined if the conflict has been resolved. If the conflict has been resolved, the functionality ends at 214. However, if the conflict has not been resolved, the functionality continues at 204 so that the user can once again decide to cancel the triggering user decision or drop another user decision of another MCS.

As an example of the functionality of FIG. 2, consider the following CSP, defined by the variables and constraints shown in Tables 3 and 4 below:

TABLE 3

| Variables and corresponding domain in the CSP | | | | | |
| --- | --- | --- | --- | --- | --- |
| Variable Name | Type | Defined Domain | Reduced domain after assertion of D = True | Reduced domain after assertion of B = true | Reduced domain after assertion of A = True |
| A | Boolean | {false, true} | {false, true} | {false, true} | {true} |
| B | Boolean | {false, true} | {false, true} | {true} | {true} |
| C | Boolean | {false, true} | {false, true} | {false, true} | {true} |
| D | Boolean | {false, true} | {true} | {true} | {true] |

TABLE 4

| Constraints defined in the CSP |
| --- |
| Constraint Defined |
| (A and B) requires C |
| (A and D) requires C |

The constraint "(A and B) requires C" means the following:

If C is true, then both A and B must be true;
If C is false, then either A or B, or both, must be false;
If either A or B, or both is false, then C must be false;
If both A and B are true, then C must be true.

At runtime, the user asserts the following user decisions in sequence:

(1) D=true;
(2) B=true;
(3) A=true;
(4) C=false.

The first three user decisions are propagated on the CSP network successfully as they are consistent with the problem and do not generate a conflict. However, when the fourth user decision, "C=false" is attempted, solver 16 detects a conflict and initiates the functionality of FIG. 2 starting at 202.

Figure 3:
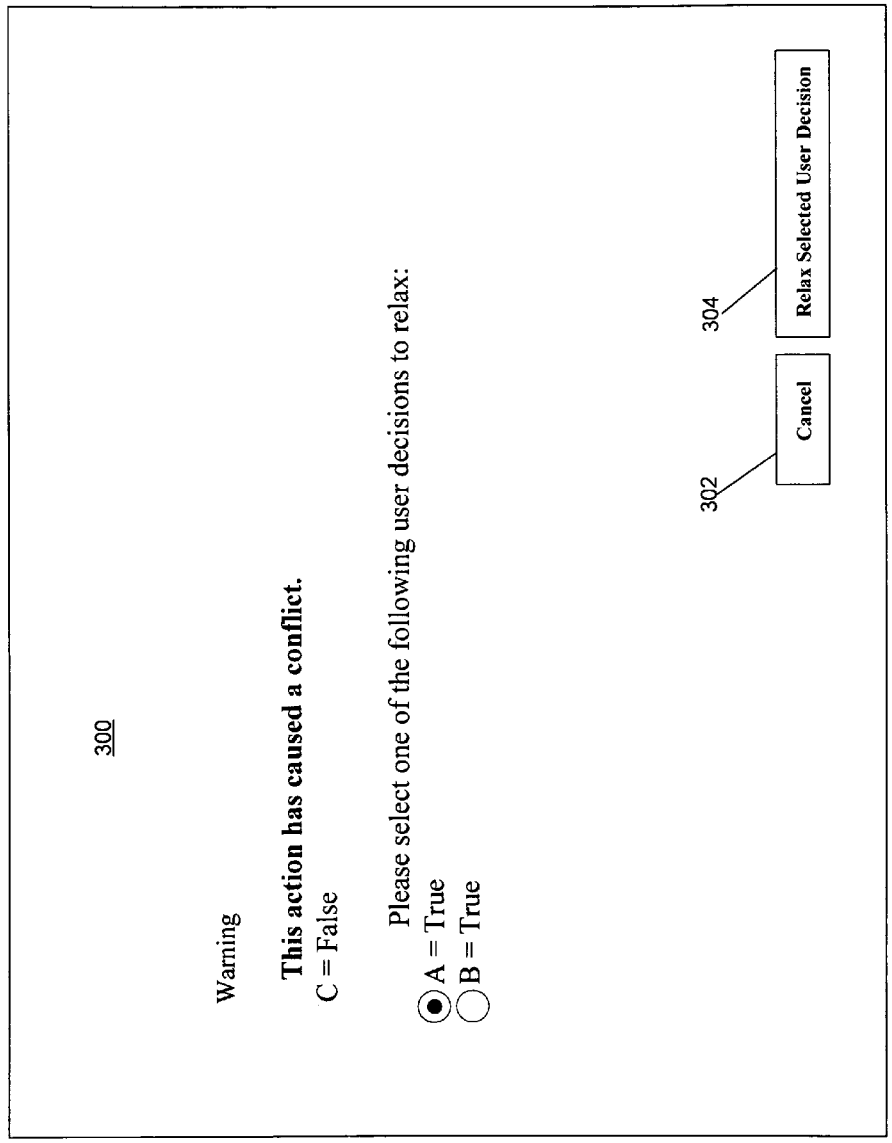
FIG. 3 illustrates an example user interface that provides the user options to resolving a conflict in accordance with one embodiment.

Solver 16 generates an MCS (per 206 of FIG. 2) and asks the user (per 208 of FIG. 2) to either drop one of the previously asserted user decisions from the generated MCS, or to cancel the last attempted user decision (i.e. C=false) per 204 of FIG. 2. FIG. 3 illustrates an example UI 300 that provides the user with an option to cancel C=False via button 302, or select one of the MCS user decisions to relax via button 304.

Figure 4:
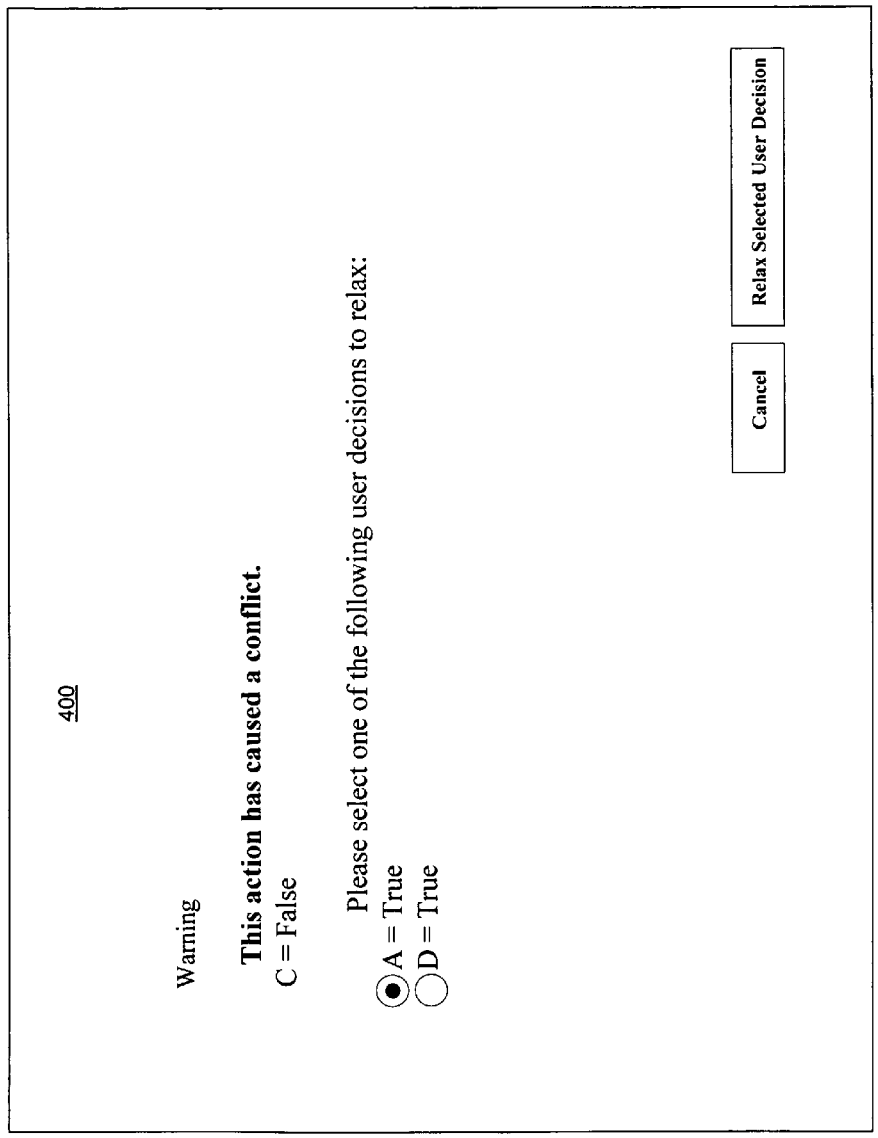
FIG. 4 illustrates another example user interface that provides the user options to resolving a conflict in accordance with one embodiment.

As shown in FIG. 3, the user is presented with two options (i.e., "A=true" and "B=true") to resolve the conflict through dropping previous user decisions. If the user opts to relax the user decision A=true, the conflict will successfully be resolved. However, if the user chooses to relax the user decision B=true, the user will be redirected to another UI 400, illustrated in FIG. 4, because relaxing the user decision B=true alone is not sufficient to resolve the conflict. Therefore, UI 400 is generated as another MCS (per 206 of FIG. 2) is generated behind the scene because the first relaxation did not fully resolve the conflict.

Upon presentation of UI 400, the user may still opt to cancel the most recent user decision, in which case solver 16 will restore the previously relaxed user decision B=true and drop the last attempted user decision C=false that caused the conflict (per 210 of FIG. 2). Otherwise, the user may opt to relax either of the previously asserted user decisions A=true or D=true. This will resolve the conflict and terminate the functionality of FIG. 2 at 214.

As disclosed, one embodiment determines a CSP conflict based on a user decision and provides the user with options to resolve the conflict. The options include canceling the user decision, or relaxing one or more previously asserted user decisions. Therefore, the user is provided with many options to resolve a conflict without requiring the solver to restart an interactive session. Further, the user is not required to independently determine what previous user decisions can be relaxed to resolve the conflict.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, causes the processor to solve a constraint satisfaction problem (CSP), the solving the CSP comprising:

receiving a first user decision, wherein the first user decision comprises a selection of a value for a variable of the CSP;

propagating the first user decision over a CSP network, wherein the propagating is performed before receiving another user decision subsequent to the first user decision;

determining a conflict based on the propagation, wherein the conflict prevents the CSP from being solved; and resolving the conflict by interactively allowing a user to cancel the first user decision or drop one or more previous user decisions and displaying the one or more previous user decisions out of the previous user decisions that would resolve the conflict when dropped, the displaying comprising separately identifying the one or more previous user decisions out of all other previous user decisions as user decisions that will resolve the conflict when dropped.

2. The computer readable medium of claim 1, wherein the one or more previous user decisions are generated by determining a first Minimum Conflict Set.

3. The computer readable medium of claim 2, the solving the CSP further comprising:

dropping a first previous user decision; and
determining a second Minimum Conflict Set.

4. The computer readable medium of claim 2, wherein the interactively allowing comprises generating a user interface that displays the first user decision and the first Minimum Conflict Set.

5. The computer readable medium of claim 3, further comprising:

canceling the first user decision; and
restoring the first previous user decision.

6. The computer readable medium of claim 2, wherein the Minimum Conflict Set comprises a minimal set of previous user decisions that are responsible for the conflict.

7. The computer readable medium of claim 1, wherein the CSP is a product configuration and the first user decision is a choice for configuring a product.

8. The computer readable medium of claim 1, wherein the one or more previous user decisions are generated by determining a minimal set of previously made user decisions together with the first user decision that is responsible for the conflict.

9. A computer implemented method for solving a constraint satisfaction problem (CSP), the method comprising:

receiving a first user decision, wherein the first user decision comprises a selection of a value for a variable of the CSP;

propagating the first user decision over a CSP network, wherein the propagating is performed before receiving another user decision subsequent to the first user decision;

determining a conflict based on the propagation, wherein the conflict prevents the CSP from being solved; and resolving the conflict by interactively allowing a user to cancel the first user decision or drop one or more previous user decisions and displaying the one or more previous user decisions out of the previous user decisions that would resolve the conflict when dropped, the displaying comprising separately identifying the one or more previous user decisions out of all other previous user decisions as user decisions that will resolve the conflict when dropped.

10. The method of claim 9, wherein the one or more previous user decisions are generated by determining a first Minimum Conflict Set.

11. The method of claim 10, wherein the interactively allowing comprises generating a user interface that displays the first user decision and the first Minimum Conflict Set.

12. The method of claim 10, further comprising:
dropping a first previous user decision; and
determining a second Minimum Conflict Set.

13. The method of claim 9, wherein the one or more previous user decisions are generated by determining a minimal set of previously made user decisions together with the first user decision that is responsible for the conflict.

14. The method of claim 9, wherein the CSP is a product configuration and the first user decision is a choice for configuring a product.

15. A solver system for solving a constraint satisfaction problem (CSP), the system comprising:
a processor;
a memory coupled to the processor; and
a constraint solver module coupled to the memory, the constraint solver module comprising functionality of receiving a first user decision, propagating the first user decision over a CSP network, determining a conflict based on the propagation, and resolving the conflict by interactively allowing a user to cancel the first user decision or drop one or more previous user decisions that were generated by determining a Minimum Conflict Set and displaying the one or more previous user decisions out of the previous user decisions that would resolve the conflict when dropped, the displaying comprising separately identifying the one or more previous user decisions out of all other previous user decisions as user decisions that will resolve the conflict when dropped;
wherein the first user decision comprises a selection of a value for a variable of the CSP;
wherein the propagating is performed before receiving another user decision subsequent to the first user decision; and
wherein the conflict prevents the CSP from being solved.

16. The solver system of claim 15, wherein the system is a product configurator and the first user decision is a choice of a configuration of a product.

17. The solver system of claim 15, wherein the interactively allowing comprises generating a user interface that displays the first user decision and the Minimum Conflict Set.

18. The solver system of claim 15, wherein the one or more previous user decisions are generated by determining a minimal set of previously made user decisions together with the first user decision that is responsible for the conflict.

19. The solver system of claim 15, further comprising:
dropping a first previous user decision; and
determining a second Minimum Conflict Set.

* * * * *